US009224202B2

(12) United States Patent
De Haan et al.

(10) Patent No.: US 9,224,202 B2
(45) Date of Patent: *Dec. 29, 2015

(54) DEVICE AND METHOD FOR EXTRACTING INFORMATION FROM CHARACTERISTIC SIGNALS

(75) Inventors: Gerard De Haan, Helmond (NL); Marek Janusz Bartula, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/110,440

(22) PCT Filed: Mar. 27, 2012

(86) PCT No.: PCT/IB2012/051449
§ 371 (c)(1),
(2), (4) Date: Oct. 8, 2013

(87) PCT Pub. No.: WO2012/140531
PCT Pub. Date: Oct. 18, 2012

(65) Prior Publication Data
US 2014/0037166 A1    Feb. 6, 2014

(30) Foreign Application Priority Data

Apr. 14, 2011  (EP) .................................... 11162384

(51) Int. Cl.
*G06K 9/00*  (2006.01)
*G06T 7/00*  (2006.01)
(52) U.S. Cl.
CPC ............. *G06T 7/0012* (2013.01); *G06T 7/0016* (2013.01); *G06T 2207/20068* (2013.01); *G06T 2207/30076* (2013.01)

(58) Field of Classification Search
None
See application file for complete search history.

(56) References Cited

U.S. PATENT DOCUMENTS 7,751,591 B2    7/2010  Bober et al.
2004/0234115 A1  11/2004  Zijp et al.
(Continued)

FOREIGN PATENT DOCUMENTS

WO    2006043258 A2    4/2006

OTHER PUBLICATIONS

Robinson, D., et al.; Efficiency and accuracy Tradeoffs in Using Projections for Motion Estimation; 2001; IEEE Trans. on 35th ASILOMAR Conf. on Signals, Systems & Computers; pp. 545-550.
(Continued)

*Primary Examiner* — Siamak Harandi

(57) ABSTRACT

A device and a method for extracting information from detected characteristic signals are provided. A data stream (26) derivable from electromagnetic radiation (20) emitted or reflected by an object (10) is received. The data stream (26) includes a continuous or discrete characteristic signal (68) including physiological information (30) indicative of desired object motion to be detected and utilized so as to extract at least one at least partially periodic vital signal of interest. A plurality of characteristic index elements (60) can be derived from the data stream (26) through a dimensional reduction (66). The plurality of characteristic index elements (60) includes a directional motion component (70) associated with a disturbance-reduced index element (40) having a determined orientation substantially aligned with a reference motion direction (41) indicative of the desired object motion. Consequently, dimensional reduced data can be utilized for detecting the vital signal of interest.

20 Claims, 7 Drawing Sheets

(56) References Cited

U.S. PATENT DOCUMENTS

| | | |
|---|---|---|
| 2008/0267455 A1 | 10/2008 | Grass et al. |
| 2009/0187112 A1 | 7/2009 | Meir et al. |
| 2009/0226071 A1* | 9/2009 | Schuler et al. ............... 382/133 |
| 2010/0056918 A1 | 3/2010 | Sato et al. |
| 2010/0061596 A1 | 3/2010 | Mostafavi et al. |
| 2010/0179611 A1* | 7/2010 | O'Brien et al. ............... 607/17 |
| 2010/0272322 A1 | 10/2010 | Koehler |
| 2013/0035599 A1 | 2/2013 | De Bruijn et al. |

OTHER PUBLICATIONS

Verkruysse, W., et al.; Remote plethysmographic imaging using ambient light; 2008; Optics Express; 16(26) 21434-21445.

* cited by examiner

DEVICE AND METHOD FOR EXTRACTING INFORMATION FROM CHARACTERISTIC SIGNALS

FIELD OF THE INVENTION

The present invention relates to a device and method for extracting information from characteristic signals, wherein the characteristic signals are embedded in a data stream derivable from electromagnetic radiation, in particular wherein the data stream comprises a continuous or discrete signal including physiological information indicative of at least one at least partially periodic vital sign of an object of interest indicated by object motion.

BACKGROUND OF THE INVENTION

US 2010/0061596 A1 discloses method of determining a similarity with a portion of a physiological motion, the method comprising the steps of:
obtaining a first image of an object;
obtaining a second image of the object;
determining a level of similarity between the first and second images; and
correlating the determined level of similarity between the first and second images with a portion of the physiological motion.

The document further discloses several refinements of the method. Although considerable progress in the field of computing performance has been made, it is still a challenge to provide for instant image recognition and image processing enabling immediate, so to say, on-line detection of desired vital signals. This applies in particular to mobile device applications commonly lacking of sufficient computing power.

A further challenge may arise from several constraints which must be taken into account for the detection of the desired signals. Commonly, detection quality can be enhanced by applying obtrusive measurement, e.g., when applying markers to an object to be monitored. Still, however, obtrusive measurement, e.g. utilizing belts or sensors attached to a person's body, is considered uncomfortable and unpleasant.

Further, as the recorded data, such as captured reflected or emitted electromagnetic radiation, especially recorded image frames, always comprises, beside of the desired signal to be extracted therefrom, still further signal components deriving from overall disturbances, by way of example, such as noise due to changing luminance conditions or a disturbing motion of observed objects, a detailed precise extraction of the desired signals still poses major challenges for the processing of such data. Furthermore, object motion related signals are, so to say, attenuated in case the object of interest is covered, e.g. by clothes or even blankets.

After all, this applies in particular when amplitudes and/or nominal values of disturbing signal components are much larger than amplitudes and/or nominal values of desired signal components to be extracted. Potentially, the magnitude of difference between the respective components can be expected to even comprise several orders.

A possible approach to this challenge may be directed to providing well-prepared and steady ambient conditions when capturing a signal of interest in which the desired signal component is embedded so as to minimize disturbing signal components overlaying the signal. However, such laboratory conditions cannot be transferred to everyday field applications as high efforts and preparation work would be necessary therefor.

The required preparation might comprise, by way of example, installation and orientation of several standard light sources and, moreover, measures for fixation of the object to be observed in order to avoid disturbing motions responsible for an even larger noise level. However, these measures are considered unlikely to be applied for everyday applications, e.g. ambulant or clinical patient monitoring, or even for lifestyle applications like sporting and fitness monitoring.

SUMMARY OF THE INVENTION

It is therefore an object of the present invention to provide a device and a method for extracting information from detected characteristic signals providing further refinements facilitating obtaining the desired signals with little efforts, especially reduced calculation and computing requirements.

It would be further advantageous to provide a device adapted for being less susceptible to disturbances influencing the captured signals to be processed and analyzed.

Furthermore, it would be advantageous to provide a device even adapted for enabling an extraction of the desired signals under considerably poor ambient conditions, e.g., small signal-to-noise ratio, varying luminance conditions and/or disturbing motion of the object to be observed different from the desired motion pattern of interest.

In a first aspect of the present invention a device for extracting information from detected characteristic signals is presented, the device comprising:
an interface for receiving a data stream derivable from electromagnetic radiation emitted or reflected by an object, the data stream comprising a continuous or discrete characteristic signal including physiological information indicative of desired object motion, the physiological information being representative of at least one at least partially periodic vital signal, and
an extractor means for extracting the physiological information from the data stream, the extractor means deriving a plurality of characteristic index elements from the data stream through a dimensional reduction, the plurality of characteristic index elements comprising a directional motion component associated with a disturbance-reduced index element, the disturbance-reduced index element having a determined orientation substantially aligned with a reference motion direction, the plurality of characteristic index elements being indicative of a derivative signal form comprising the physiological information.

The present invention is based on the insight that, when aiming at an extraction of the desired vital signal, in general a poor signal-to-noise ratio has to be considered. Basically, this ratio can be considered an implication of, inter alia, a significant difference between the level of desired object motion and the level of disturbing motion caused by the object or even further sources. Further, the desired object motion can be hidden to some extent, e.g. when the object is covered by clothes or a blanket. Furthermore, disturbances occurring according to property changes of data stream components which are not caused by mere motion (e.g. varying luminance conditions) have to be expected. Also these disturbances can be considerably larger in magnitude than the desired object motion indicative of the desired vital signal.

Nevertheless, however, the detection of the desired signal can be facilitated by, so-to-say, "accepting" the disturbances inherent in the data stream. Further, when taking into account that the desired vital signal can be characterized by particular properties generally distinguishing from overall disturbances, the signal detection can be improved significantly. By way of example, the named particular properties may comprise a certain frequency band, a common preferential direction, and an expected amplitude band, all of which assumed to undergo considerably small changing over time in relation to common disturbances.

The device of the invention can be therefore exemplarily utilized for, but not limited to, detecting an object's respiration rate, respiration rate variability, or their derivates. Such vital signs comprise properties that can be readily assumed to a certain extent. Still, the detection can be directed to further at least partially periodic vital signals assuming that they are at least somehow associated with respective directional motion patterns that can be drawn for the dimensional reduction.

In other words, e.g. when aiming at an extraction of the object's present breath rate, it can be assumed that a cycle of breathing in and breathing out is represented by a characteristic lifting and lowering of the chest portion of the body. Needless to say, respiration can also be represented by a characteristic motion of an abdomen portion and even a face portion (e.g. nose or mouth) of the object. This object motion somehow represents the physiological information related thereto, e.g. respiration frequency, considerably small respiration amplitudes and a characteristic direction of the pulsation of the respective portion of the person's body, namely the reference motion direction. Vice versa, from the object motion extracted from the data stream the desired vital signals can be derived, or, more precisely, restored.

Thus, considering the reference motion direction on the one hand side allows for a significant reduction of the data stream information while on the other side still enabling the detection of the desired vital signals. Hence, required computing capacity can be reduced. Furthermore, the dimensional reduction emphasizes the signal quality as undesired disturbances such as motion unrelated to the desired object motion direction can be eliminated from the data stream to a great extent.

In other words, the input data stream, e.g. a sequence of image frames each having entities arranged in two dimensions, wherein the entities may further comprise additional image properties, such as color properties associated with a color space, e.g. brightness, hue, and saturation, can be transferred into a sequence of dimensional reduced elements, namely the characteristic index elements. The characteristic index elements may still comprise further color related or general data stream related information. In essence, the desired vital signals are reflected in temporal changes inherent to a sequence of characteristic index elements.

According to the invention the characteristic index elements are aligned with the reference motion direction, though, so to say, in a mediate way. The desired components of the data stream can be enhanced while disturbing components mainly directed orthogonal thereto can be reduced or even eliminated. Thus, a great improvement in noise reduction and signal quality can be achieved.

In this context, it should be noted that the alignment of the characteristic index elements with the reference motion direction can be considered "mediate" in that the latter can be considered a mere ideal vector representing the real genuine instant breath motion of the object. In other words, the reference motion direction varies over time according to even slightest disturbances occurring to the object and remaining in the data stream. It is not intended to perfectly match each characteristic index element with the respective reference motion direction. This would lead to enormous efforts for calculation. On the contrary, the derivation of the characteristic index elements is based on the disturbance-reduced index element which is preferably closely aligned with the reference motion direction.

Needless to say, also a small deviation from the (theoretical) reference motion direction, e.g., less that 15°, preferably less than 10°, further preferred less than 5°, does not lead to a significant signal loss or corruption. In this context, it is recalled that for exemplary applications, e.g. the determination of respiration rate or respiration rate variability, the most desired signal of interest is the frequency of the periodic motion rather than absolute amplitudes thereof. Exemplary approaches to the determination of the disturbance-reduced index element will be presented below.

The derived characteristic index elements can be sequenced, wherein a discrete sequence can be transformed into a continuous sequence, or vice versa, the sequencing eventually directly or indirectly resulting in the derivative signal form.

According to an embodiment of the device for extracting information, the data stream comprises a sequence of image frames, wherein each single characteristic index element is derived from a respective image frame.

According to a further embodiment of the device for extracting information, the device comprises a sensor means for detecting an electromagnetic radiation within at least one particular wavelength range selected from the group consisting of visible light, infrared light, and ultraviolet radiation, the sensor means being connectable to the interface.

In the alternative, data already captured and stored can be delivered to the interface and processed by the device. When observing a living being, in particular an animal or, more particularly, a human being, vital signals can be derived from slight variations in the radiation emitted, e.g. infrared light, and/or reflected, e.g. visible light and ultraviolet radiation. For everyday application it could be appreciated if substantially visible light is detected and analyzed. To this end, beside of common natural or artificial light sources no further radiation sources are required and/or have to be considered during analysis.

This embodiment can be further developed in that the sensor means comprises a camera adapted for capturing a signal within a signal space selected from the group consisting of RGB, sRGB, Rg chromaticity, HSV, HSL, CMYK, YPbPr, YCbCr, xvYCC, and combinations thereof. It goes without saying that also normalizing measures can be applied to the data stream so as to obtain signals less affected by varying illumination conditions.

In other words, video cameras providing a sufficient color depth, even so-called webcams, can be utilized for observing the object of interest and recording the data stream to be analyzed. It goes without saying that also derivates of the named signal space types may be utilized, such as log RGB. It can be further envisaged to combine several distinct signal spaces at least partially so as to provide a broader spectral basis for the required analyzing processes.

In this context, as an alternative, also a signal space can be envisaged which comprises wavelength ranges of visible light and of infrared light. In this way, the device can be suitably adapted to varying overall conditions such as greater changes in luminance conditions, or even day and night changes. The latter applies in particular when sleeping living beings are to be monitored. In this context, visible light based illumination could imply adverse effects on the well being or even influencing the desired vital signal. By way of example, an ordinary RGB camera could be combined with a night vision camera in order to allow for a long-term monitoring with day and night changes.

Besides that, it can be further envisaged to apply an acceleration sensor to the sensor means or a respective housing. In this way global motion of the camera with respect to the monitored area can be compensated for. It is appreciated if the acceleration sensor is adapted to detect motion of the sensor means in all spatial directions. The acceleration sensor can be further adapted to deliver a stop signal in case a threshold with respect to sensor means motion or acceleration is exceeded. When the undesired motion comes to an end, i.e. the acceleration sensor indicates that monitoring can be resumed or continued, a respective start signal can be delivered.

According to an advantageous embodiment, the extractor means is further adapted to determine the orientation of the disturbance-reduced index element taking into account the reference motion direction.

In this way, also a reference direction indicative of disturbing motion can be determined additionally. Basically, this reference direction is orientated substantially orthogonal to the disturbance-reduced index element. Motion aligned with the disturbing motion reference direction can be considered being substantially non-indicative of the desired signals and therefore disregarded when deriving the plurality of characteristic index elements.

Determining the disturbance-reduced index element can be carried out taking into account basic knowledge of the orientation of the reference motion direction. This determination can be carried out in a computing resources saving manner.

In this way, on-the-fly processing of the data stream can be enabled utilizing common hardware components, or even mobile devices. Basically, the signal extraction can be carried out in an instant or quasi instant mode.

In an initial setup, knowledge about reference motion pattern can be utilized. For instance, when a patient is staying in bed, the up and down motion of the chest associated to respiration causes a disturbance-reduced index element basically orientated vertically.

It can be envisaged to utilize a "set" disturbance-reduced index element at least during the initial phase of monitoring of "static", e.g., sleeping, objects. For other applications having more "dynamic" observed objects, a predetermination of the initial disturbance-reduced index element can be carried out. To this end, the captured sequence can be scanned for motion patterns indicative of vital signals (know frequency band, amplitude range, and preferential directions). Basic physiology knowledge can be applied as well. For instance, it is more likely that an object to be monitored is lying, sitting or walking than taking abnormal positions (e.g. staying bottom up). Such pattern can be detected when applying basic image recognition steps. Needless to say, a predetermination of the initial disturbance-reduced index element may cause increased computing requirements during the initial state. Still, however, after having detected the disturbance-reduced index element the device can switch to standard operation mode including the dimensional reduction leading to significantly reduced computing requirements.

During operation a more or less periodically validation of the detected disturbance-reduced index element can be applied. By way of example, moving averages can be considered for detecting disturbance-reduced index element. In case a discrete image stream is utilized for the determination, it can be further envisaged to skip certain images during the determination of the disturbance-reduced index element. In this way, disturbing object motion requiring an update or adjustment of the orientation of the disturbance-reduced index element can be detected, e.g. when turning or rolling in bed. To this end, a threshold can be set, e.g. equivalent to a deviation of 15°, 10° or even 5°. In case the threshold is exceeded, the disturbance-reduced index element can be updated.

According to an even further embodiment of the device, the extractor means is adapted to detect an indicative portion of the respective image frame, the indicative portion being highly indicative of the desired object motion.

Consequently, orientation and alignment of the sensor means and detection of the frame size to be captured can be simplified. Preferably the frame size to be observed by the sensor means covers the whole area in which object motion is expected. Thus, reorientation of the sensor means, e.g., excessive camera work, can be reduced or even avoided.

According to some embodiments also the detection and recording of so-called non-indicative areas can contribute to the vital signal extraction in that reference patterns non-indicative of the desired signals can be drawn for the determination of the orientation of the disturbance-reduced index element. In this way, reference data can be obtained. Approaches utilizing reference patterns are presented below.

According to a further advantageous embodiment, the device for extracting information comprises an analyzing means for determining temporal variation of the derivative signal form or the desired object motion component corresponding to the least one at least partially periodic vital signal.

The desired vital signal is clearly reflected in the derivative signal form or the desired object motion component thereof. Signal processing methods can be utilized for extracting the desired signal, e.g. the respiratory rate, the respiratory rate variability, or further derivates thereof.

According to a preferred embodiment of the device for extracting information, the derivative signal form is further indicative of a remaining disturbing signal component, the device further comprising a converter means for converting the derivative signal form by enhancing a desired object motion component of the derivative signal form indicating the vital signal and by suppressing a remaining disturbing signal component.

In case the characteristic index elements still comprise disturbances overlaying the desired signal, e.g. global motion accidently in line with the disturbance-reduced index element, the signal-to-noise ratio can be improved by suppressing remaining disturbances. To this end, several signal correction or restoration steps can be applied.

For instance, the converter means can be adapted for clipping or soft clipping the derivative signal form. Soft clipping can be directed to attenuate undesired outliers in the signal form likely indicative of disturbing motion or noise. In this way, an instant or quasi instant control circuit can be provided for the data processing. By way of example, a value of a preceding signal can be buffered and applied to a clipping calculation of a subsequent value so as to smooth the signal form without considerably worsening the desired vital signal to be extracted therefrom. Clipping can involve taking the logarithm of respective signal values.

Alternatively, or in addition, at least one control pattern can be derived from the data steam. Again referring to an exemplary detection of the respiratory rate, e.g. of a patient in a hospital, it can be envisaged that a pattern indicative of general global motion and/or a pattern indicative of object motion non-indicative of the desired signal can be considered in addition to the portion of interest highly indicative of the desired motion. For instance, the global motion pattern can be a further object supposed to be immobile or steady over time. This pattern can be drawn for detecting a disturbing motion of the sensor means, e.g. of the camera with respect to the monitored image frame objects. On the other hand, object motion pattern non-indicative of the desired signal, e.g. motion of legs or arms, can be utilized for determining object motion which is not caused by respiration. In this way, even when tossing and turning in bed, a patient can be monitored with satisfactory results.

Furthermore, the detected disturbing motion patterns can be utilized for tracking and adjusting the disturbance reduced index element, as indicated above. Besides, these patterns are somehow reflected in the derivative signal form. In this connection, it can be envisaged that also the detected disturbing patterns can be processed by the named dimensional reduction taking into consideration the disturbance-reduced index element. In this way, remaining disturbing signal components can be determined that are expected to overlay the desired object motion component in the derivative signal form. By applying signal separation measures, the remaining disturbing signal components can be subtracted from the derivative signal form. Hence, the desired signal can be clearly detected; disturbances can be suppressed even to a greater extent.

There exist several embodiments of the extractor means and the converter means. In a first, fairly simple embodiment both, the detector means and the converter means, are embodied by a processing unit, in particular a processing unit of a personal computer, which is driven by respective logic commands. Such a processing unit may also comprise suitable input and output interfaces.

However, in the alternative, each of the extractor means and the converter means can be embodied by a separate processing unit driven or derivable by respective commands. Hence, each respective processing unit can be adapted to its special purpose.

Consequently, a distribution of tasks may be applied, wherein distinct tasks are processed, for instance, executed on a single processor of a multi-processor processing unit, or, again referring to a personal computer, image processing-related tasks are executed on an image processor while other operational tasks are executed on a central processing unit.

Also the analyzing means can be embodied by a processing unit driven by logic commands. To this end, a separate processing unit, or a processing unit which is common for the extractor means, the converter means and the analyzing means can be utilized.

It can be further envisaged that the processing unit also embodies the extractor means, besides the converter means and the analyzing means. Also the sensor means can be an integral component of the device. Besides that, however, remote sensor means connectable to the interface via wireless or wire based communication means can be utilized as well.

According to an advantageous embodiment, the dimensional reduction comprises agglomerating and projecting data stream properties associated with respective sub entities of the image frame comprised in the data stream to the disturbance-reduced index element, thereby obtaining the respective characteristic index element.

In this manner, multidimensional information provided in the data stream can be compressed without loss of signal information substantially orientated parallel to the disturbance-reduced index element. Thus, motion information indicative of the desired signal to be extracted is still contained in the resulting characteristic index element.

In other words, e.g. when processing a single image frame from a sequence of image frames, the two-dimensional resolution of the image, e.g. pixel entities arranged in lines and columns, is converted into one-dimensional information. In order to simplify, it is assumed that the disturbance-reduced index element is in alignment with the column direction. Otherwise, coordinate transformation can be applied to the image so as to align the image coordinate system with the disturbance-reduced index element. Now, line by line data stream properties can be projected to the disturbance-reduced index element, so as to arrive at the respective characteristic index element characterizing the image.

For instance, the data stream properties can be selected from the group consisting of mean pixel values, pixel value standard deviation, contrast ratio, brightness properties, combinations thereof, and their derivates. Also further color space or image frame related properties can be drawn for the line by line agglomeration. By way of example, the determination of the respective characteristic index element value of a line may comprise a calculation of the cross total pixel value over all pixels of this line. For instance, a summarized color value for the whole line becomes a single entity of the characteristic index element in this way. When utilizing pixel standard deviation, the line by line agglomeration can comprise consideration of surround information embedded in neighboring lines as well.

A huge advantage of the dimension reduction approach is that even so-called mediate detection of the desired signals can be enabled. This applies in particular under poor contrast conditions, for instance, when the object is covered somehow, e.g., when wearing clothes or being covered with blanket, etc. Such "softening" of the edges or the shape of the monitored object does not imply an adverse effect on the signal detection. In particular, also soft edges, e.g. wrinkles or folds in cloths or blankets, undergo the physiological motion indicative of the signal of interest. Summing up respective pixel properties already enhances these soft edges as small deviations between adjacent pixels will be reflected in summed up deviations when agglomerating line by line.

On the contrary, common image recognition methods rely on the detection of sharp edges in each single two-dimensional image in this connection. The named soft edges pose major challenges to these methods when simply aiming at edge detection. Therefore, artificial conditions such as standard light sources or special markers have to be applied in order to enable the data processing and signal detection to be carried out. In this context, it is emphasized that edge detection is likely to be applied to each single image frame while according to the approach presented herein merely a compressed data set, namely the sequence of characteristic index elements, needs to be processed for the detection of the desired signals embedded therein.

In other words, a sequence of image frames can be replaced by a sequence of image frame "slices". However, each "slice" still comprises all information required for the signal detection.

According to an even further embodiment of the device for extracting information, the conversion of the derivative signal form further comprises processing the derivative signal form or the desired object motion component embedded therein, wherein the processing is selected from the group consisting of motion compensation, filtering, windowing, clipping, edge emphasizing, and edge de-emphasizing.

Basically, the derivative signal form can be obtained by sequencing the characteristic index elements. In this way, a motion profile highly indicative of the desired signal is derived. This motion profile comprises spatial frequency information, namely prominent elements determined by agglomerating data stream properties, for instance, line by line summing up of image pixel values. Especially entities rich in contrast occurring in the data stream can be represented by prominent elements in the motion profile. Eventually, a specific given band of spatial frequency (determined by the desired object motion) can be addressed to for determining the desired signal.

The motion profile can be processed in order to further improve the signal-to-noise ratio. For instance, band pass filters or windowing means can be utilized. In this context, according to a further embodiment it is appreciated if the analyzing means is further adapted for filtering the derivative signal form or the desired object motion component and for enhancing a signal component at a bandwidth between 0.2 Hz and 10 Hz, preferably between 0.5 Hz and 3.5 Hz.

Again referring to an exemplary detection of the breath rate, breath motion indicative prominent elements on an each characteristic index element undergo a specific spatial pulsation when sequencing a large number of characteristic index elements. On the contrary, prominent elements non-indicative of breath motion, e.g. representing edges staying constant over time, generally form essentially straight lines over time in the sequence of characteristic index elements. Further, prominent elements non-indicative of breath motion, but subjected to random motion, e.g., arm or leg motion, are represented by respective randomly curved lines in the motion profile formed by the sequence of characteristic index elements. Taking into account these insights, the desired signal can be even further enhanced.

Further processing can be applied so as to increase contrast in the motion profile. Selecting prominent curves or edges supposed to be caused by the desired vital signal can finally lead to the derivative signal form which can be understood as a single graph pulsating over time.

In other words, the derivative signal form can represent least a relative offset between a characteristic index element and a preceding or subsequent characteristic index element or at least a distance between characteristic projected data stream properties of the same characteristic index element (i.e., between a prominent entity indicative of the desired motion and a prominent entity non-indicative of the desired motion).

Additionally or in the alternative, a phase-plane correlation, or even phase-line correlation in case the derivative signal form graph is already derived from the motion profile, can be applied to the acquired data. In this way, an alternative abstract "visualization" of the data stream information facilitates detection of periodic motion patterns.

Furthermore, knowledge of image composition can be utilized for determining edges to be emphasized and edges to be de-emphasized in the motion profile. For instance, it can be fairly assumed that sharp edges in the motion profile indicative of high contrast edges (substantially aligned with the disturbance-reduced index element) in the initial image are not cause by object motion indicative of the vital signal. More likely, these edges can be traced back to static edges, e.g. furniture, windows, etc. It can be envisaged to reduce the influence of these edges by de-emphasizing. On the other hand, edges indicative of the desired motion are supposed to be soft, therefore being underrepresented in the motion profile, can be emphasized. This applies in particular, when the object is covered by a blanket or wearing clothes, wherein the object's motion is mainly represented by folds in the fabric.

According to a further embodiment, the device is adapted to apply an integral transformation to at least one respective characteristic index element, thereby obtaining spectral information indicative of the desired object motion indicative of the desired vital signal.

In this manner, a further processing step enhancing the signal-to-noise ratio can be applied to the characteristic index element before forming the motion profile. To this end, for instance, a spectral analysis can carried out. Thus, the characteristic index element can be supplemented or even replaced by information indicating dominant frequencies embedded therein. In this context, it is noted that the frequency peaks obtained by this measure are not indicative of the desired signals when considered in isolation. However, when viewing at a plurality of spectral analyses, each of which derived from a respective characteristic index element, the desired signal can be detected.

This embodiment can be further developed in that the device is adapted to apply a Fourier transformation to respective characteristic index elements so that a sequence of magnitude ranges indicative of the desired vital signals can be obtained.

This embodiment relies on the insight that the peaks provided in the magnitude spectrum also move due to the desired motion indicative of the signal of interest. Therefore, a sequence of magnitude spectra can be analyzed for pulsation indicative of motion-related frequencies. Finally, also the derivative signal form which can be derived therefrom can be understood as a single graph pulsating over time representing the desired vital signal.

The spectral analysis approach can be utilized alternatively or in addition to the approach relying on a sequence of characteristic index elements indicating location related agglomerated data stream properties.

As indicated above, according to an advantageous embodiment of the device for extracting information, it is preferred if the device is further adapted for compensation for disturbing motion with respect to object motion non-indicative of the desired vital signal or to overall relative motion between the object and the sensor means.

This compensation can be carried out by means of pre-processing, e.g. on the image frame sequence, or by means of post-processing, e.g. on the derived motion profile formed by the sequence of characteristic index elements. In the alternative, also when determining or adjusting the desired disturbance-reduced index element, also some kind of motion compensation is carried out. It goes without saying that a combination of these approaches can be utilized for motion compensation.

A device in accordance with the present invention can be utilized in the field of health care, e.g., unobtrusive clinical or ambulant patient monitoring, or even sleep research. Further application can be found in the field of lifestyle products and sports, e.g. workout and training monitoring.

Advantageously, an object to be observed can enjoy a certain freedom of motion without adverse effects on the signal detection. This applies in particular in case the disturbance-reduced index element and also the region of interest are updated frequently. So the object can be "tracked" during monitoring.

Hence, by way of example, further utilization can be found in the field of health care, e.g., unobtrusive clinical or ambulant patient monitoring, or even sleep research. In this connection, also surveillance directed to the so-called sudden infant death syndrome or similar diseases can be addressed to by a device according to the invention. Further application can be found in the field of lifestyle products and sports, e.g. workout and training monitoring. Even further applications can be found in the field of image processing. It is emphasized that even objects covered to some extent, e.g. when wearing clothes or staying in bed under a blanket, can be monitored in an unobtrusive manner.

In a further aspect of the present invention a method for extracting information from detected characteristic signals is presented, comprising the steps:

receiving a data stream derivable from electromagnetic radiation emitted or reflected by an object, the data stream comprising a continuous or discrete characteristic signal including physiological information indicative of desired object motion, the physiological information being representative of at least one at least partially periodic vital signal, extracting the physiological information from the data stream by deriving a plurality of characteristic index elements from the data stream through a dimensional reduction, the plurality of characteristic index elements comprising a directional motion component associated with a disturbance-reduced index element, the disturbance-reduced index element having a determined orientation substantially aligned with a reference motion direction, the plurality of characteristic index elements being indicative of a derivative signal form comprising the physiological information.

Advantageously, the method can be carried out utilizing the device for extracting information of the invention.

According to an even further aspect of the invention a computer program is presented, the computer program comprising program code means for causing a computer to carry out the steps of the method for extracting information of the invention when said computer program is carried out on a computer, or on a mobile device.

Preferred embodiments of the invention are defined in the dependent claims. It shall be understood that the claimed method has similar and/or identical preferred embodiments as the claimed device and as defined in the dependent claims.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
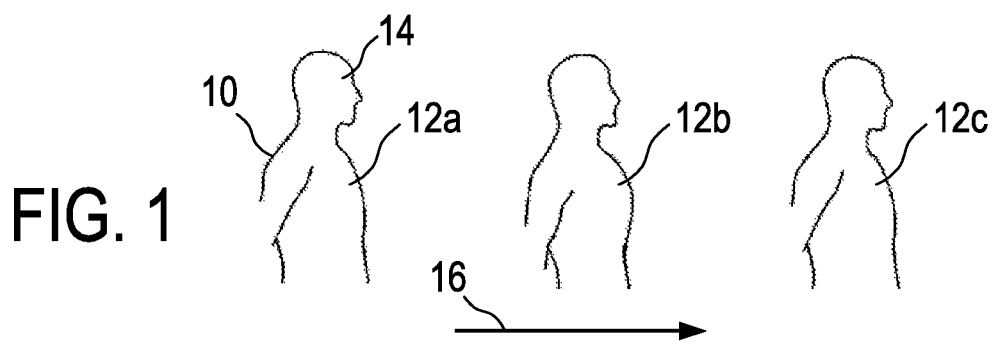
FIG. 1 shows a schematic illustration of an object's motion indicative of an exemplary vital signal.

FIG. 1 shows a schematic illustration of an object 10 which experiences motion indicative of a signal of interest. The object 10 undergoes a characteristic motion of an indicative portion 12 due to respiration. When breathing, expansion and contraction of the lungs causes slight motion of characteristic portions of living beings, e.g. lifting and lowering of the chest. Also abdominal breathing can cause characteristic motion of respective parts of the object's body. At least partially periodic motion patterns induced by physiological processes can occur in many living beings, particularly in humans or animals.

Over time, as indicated by an arrow 16, the indicative portion 12 is moved between a contracted position, indicated by reference numerals 12a, 12c, and an extracted position, indicated by 12b. Essentially, based on this motion pattern, for instance the respiration rate or respiration rate variability can be assessed. While the indicative portion 12 is pulsating over time, a non-indicative portion 14 remains substantially motionless. Certainly, also the non-indicative portion 14 undergoes diverse motion over time. However, these motions do not correspond to the periodic pulsation of the indicative portion 12.

Figure 2:
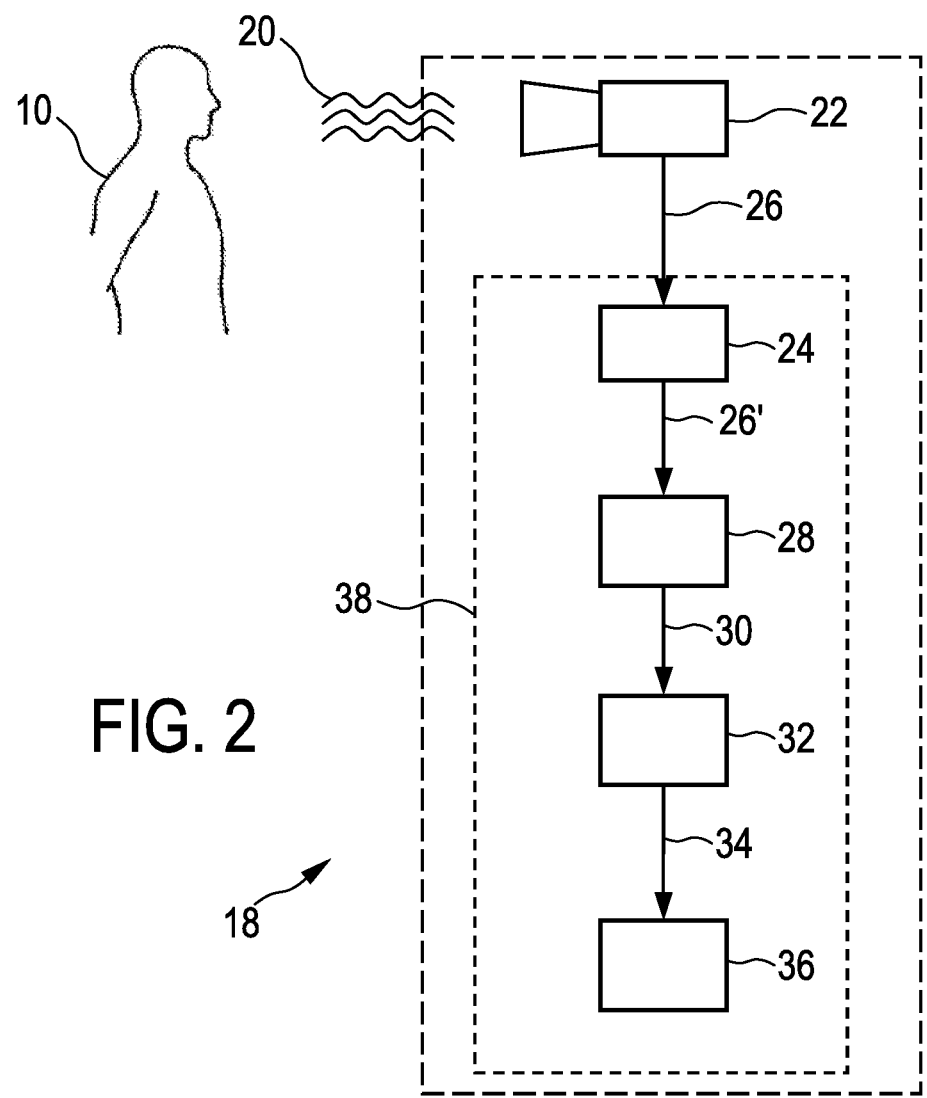
FIG. 2 shows a schematic illustration of a general layout of a device in which the present invention can be used.

In this context, referring to FIG. 2, a device for extracting information is illustrated and denoted by a reference numeral 18. The device 18 can be utilized for recording image frames representing the object 10. The image frames can be derived from electromagnetic radiation 20 emitted or reflected by the object 10. For extracting information from the recorded data, e.g. a sequence of image frames, a defined part or portion of the object 10 can be observed by a sensor means 22. The sensor means 22 can be embodied, by way of example, by a camera adapted to capture information belonging to at least a spectral component of the electromagnetic radiation 20. It goes without saying that the device 18 also can be adapted to process input signals, namely an input data stream, already recorded in advance and, in the meantime, stored or buffered. As indicated above, the electromagnetic radiation 20 can contain a continuous or discrete characteristic signal which can be highly indicative of at least one at least partially periodic vital signal.

Known methods for obtaining such vital signals comprise tactile respiration rate monitoring or remote respiration rate monitoring relying on markers applied to the object of interest. To this end, however, obtrusive monitoring is required. As indicated above, an alternate approach is directed to unobtrusive remote measuring utilizing image processing methods.

The data stream 26 comprising the continuous or discrete characteristic signal can be delivered from the sensor means 22 to an interface 24. Needless to say, also a buffer means could be interposed between the sensor means 22 and the interface 24. Downstream of the interface 24 an extractor means 28 is provided which is adapted to extract the desired physiological information (namely embedded in the characteristic index elements to be derived therefrom) from a conducted data stream 26' received by the interface 24. Physiological information 30 can be obtained by the extraction, though still comprising disturbing signal components. Further, a converter means 32 may follow which is adapted for processing the physiological information 30 derived by the extractor means 28. The preprocessed signal extracted by the extractor means 28 still can comprise large noise-indicative components. In this connection, the converter means 32 can be applied for isolating and enhancing the desired signal component indicative of the vital signal of interest from the overall signal delivered thereto.

Having extracted a converted signal component 34, further post processing of data can be carried out by an analyzing means 36. To this end, the post processing can comprise clipping, bandwidth filtering and/or Fourier analysis. Further post processing measures can be envisaged contributing to an even further improved detection of the desired signal of interest, e.g. of a dominant respiration rate indicative frequency peak in the continuous or discrete characteristic signal.

The extractor means 28, the converter means 32, and the analyzing means 36 can be jointly embodied by a common processing unit 38, e.g. a central processing unit having a single processor or multiple processors. Also the interface 24 can be connected thereto in a common processing device housing the respective subcomponents. By way of example, the processing device 38 can be embodied by a personal computer driven by respective logic commands. In case the sensor means 22 is also jointly connected to the interface 24 by means of hardware, a capturing unit may house the respective subcomponents. For instance, also a mobile device, e.g. a smart phone, or a mobile health monitoring device, comprising a camera or being connectable to a camera can be utilized for carrying out an embodiment of the invention.

However, in the alternative, it can be envisaged to combine a separate sensor means 22 with the processing device 38. This connection can be established by means of cable links or by means of wireless links. In place of the sensor means 22 also a storage means comprising prerecorded data could be connected to the processing device 28.

Figure 3:
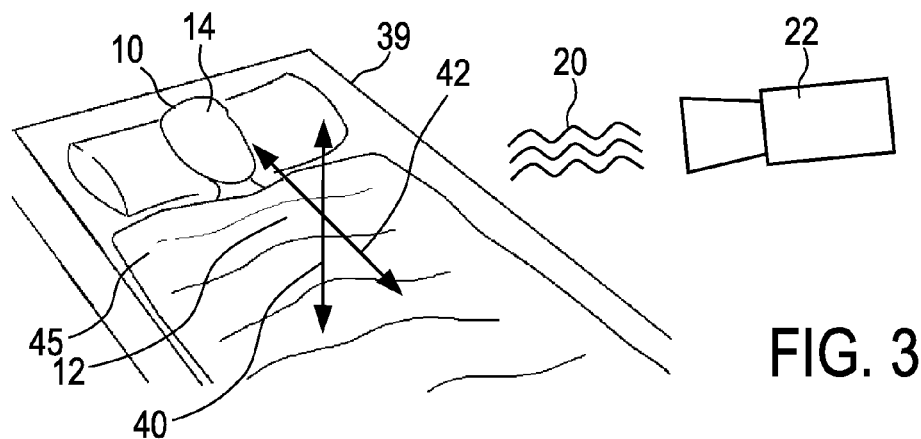
FIG. 3 shows a schematic illustration of an arrangement of an object to be monitored.

With reference to FIG. 3, a common situation in which unobtrusive vital signal detection and monitoring faces major challenges is presented. The object 10, e.g. a patient staying in bed, is resting on a support 39. The object's head comprising the non-indicative portion 14 is exposed and pillowed while the indicative portion 12 is covered by a blanket 45. Thus, the signal caused by motion of the indicative portion 12 is attenuated. Therefore, unobtrusive signal detection is considerably difficult. The sensor means 22 is positioned so as to observe the indicative portion 12. To this end, an exemplary coordinate system represents a direction in which respiration-indicative motion can be expected. This direction is indicated by a disturbance-reduced index element 40. Further, an orthogonal index element 42 represents a direction in which few or even no respiration-indicative motion can be expected.

Assuming that the desired pulsation is orientated in a single reference direction, it is understood that the orthogonal index element 42 may cover a whole plane orthogonal to the disturbance-reduced index element 40.

Basically, the sensor means 22 can be placed in any direction, provided that the object motion along the disturbance-reduced index element 40 can be sufficiently captured. In this connection, it is preferred if the sensor means 22 is orientated substantially orthogonal to the disturbance-reduced index element 40. However, also significant deviations may occur while the detection of the desired signals is still enabled. In this manner, also considerable object motion, e.g. when tossing and turning in bed, can be compensated for. In fact, placing the sensor means 22 substantially parallel to the disturbance-reduced index element 40 would cause major adverse implications on the signal detection. Again referring to the general arrangement provided in FIG. 3, it is understood that for some potential sensor means orientations it has to be expected that these adverse condition may occur, e.g. when placing the sensor means lateral to the long side of the support 39. Hence, when turning in bed, the reduced index element 40 also turns, thereby reducing the effective angle between the sensor means orientation and the reduced index element 40 leading to a reduced signal level.

In this context, it can be envisaged to arrange two or even more sensor means in distinct positions with respect to the object 10 so as to enable a, so to say, stereometric monitoring capable of tracing all possible orientations of the disturbance-reduced index element 40.

Figure 4:
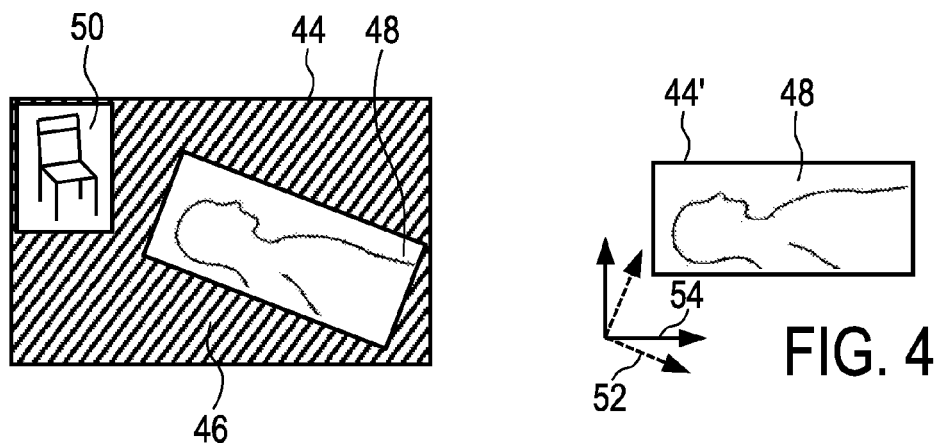
FIG. 4 shows a schematic illustration of an exemplary data stream frame from which a characteristic index element can be derived.

FIG. 4 depicts an exemplary captured image frame 44 showing a representation of the object 10 in an indicative portion 48 of the whole frame. The indicative portion 48 can be detected at this early stage during a pre-processing stage enabling a reduction of the field of view, thereby reducing the data stream volume. To simplify subsequent processing, a coordinate transformation can be applied to the processed image frame 44'. In this way, a deviation between a coordinate system 52 underlying the originally captured image frame 44 and a coordinate system 54 indicative of the disturbance-reduced index element 40 and the orthogonal index element 42 can be compensated for.

Further, FIG. 4 shows a reference portion 50 of the image frame 44. The reference portion may represent steady image objects which can be drawn as reference pattern for motion compensation. Remaining portions 46 of the image frame 44 can be masked and disregarded for subsequent analyses of the data.

Figure 5:
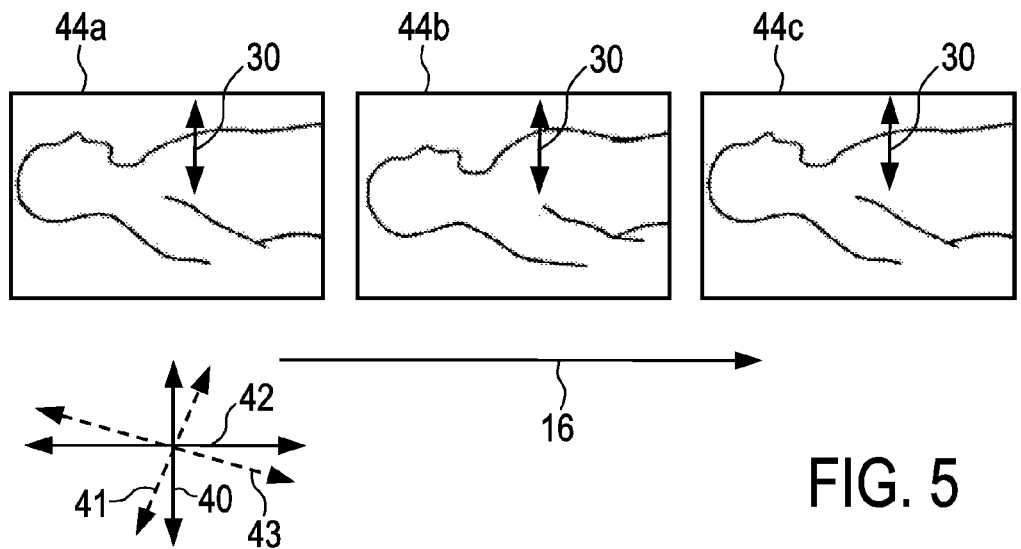
FIG. 5 shows a schematic exemplary data stream frame sequence from which a plurality of characteristic index elements can be derived.

FIG. 5 illustrates a sequence of image frames 44a, 44b, 44c representing the breath motion of the object 10 already indicated by FIG. 1. The desired vital signal of interest is represented by physiological information indicated by an arrow 30, namely the lifting and lowering of the chest. The physiological information 30 to be extracted is aligned with the disturbance-reduced index element 40. Motion aligned with the orthogonal index element 42 orientated orthogonal to the disturbance-reduced index element 40 is considered to be non-representative of the signal of interest. For the sake of completeness, also a reference motion direction 41 and an orthogonal reference direction 43 are illustrated in FIG. 5. As indicated above, an instant determination of the disturbance-reduced index element 40, e.g. separately for each image, frame may pose major challenges. In this context, it is noted that even a considerable deviation between the disturbance-reduced index element 40 and reference motion direction 41 does not lead to a significant signal loss. Consequently, it is not necessary to precisely determine the disturbance-reduced index element 40 with high precision at all events.

Therefore, small deviations between disturbance-reduced index element 40 and the reference motion direction 41 can be accepted. This enables significant reduction of computing processing requirements. Further, when taking into account the ratio between expected frequencies of the vital signal to be detected and common frame rates utilized for image processing, it is understood that for the determination of the disturbance-reduced index element 40 numerous image frames can be skipped, e.g. merely one out of five or even ten image frames has to be considered. For instance, a control circuit can be established, wherein a threshold is set describing an accepted deviation. In case the threshold is exceeded, the disturbance-reduced index element 40 is adjusted. Finally, a new threshold can be determined.

Figure 6:
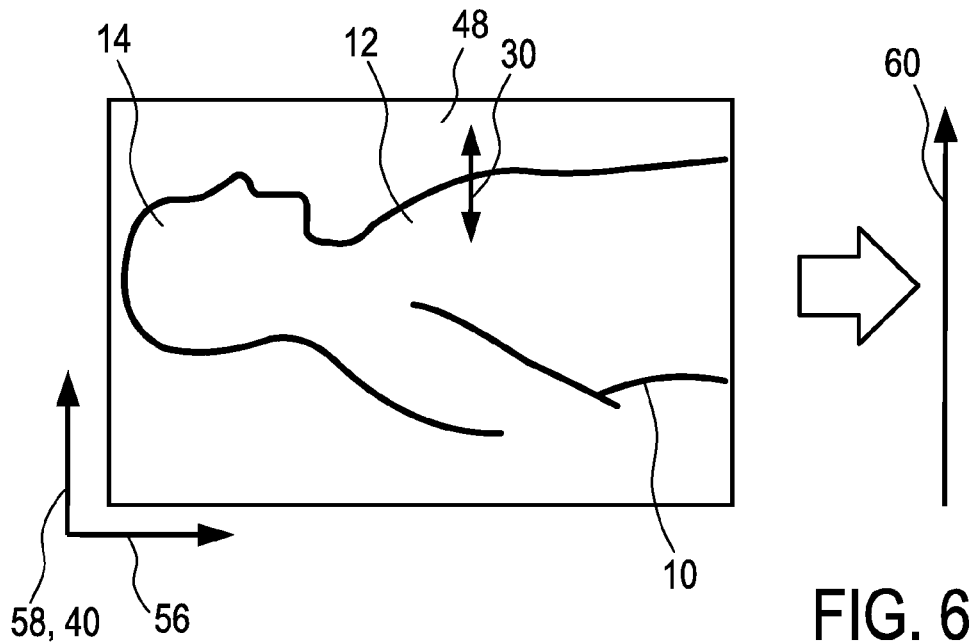
FIG. 6 shows a further schematic exemplary data stream frame and a dimensional reduced characteristic index element derived therefrom.
Figure 7:
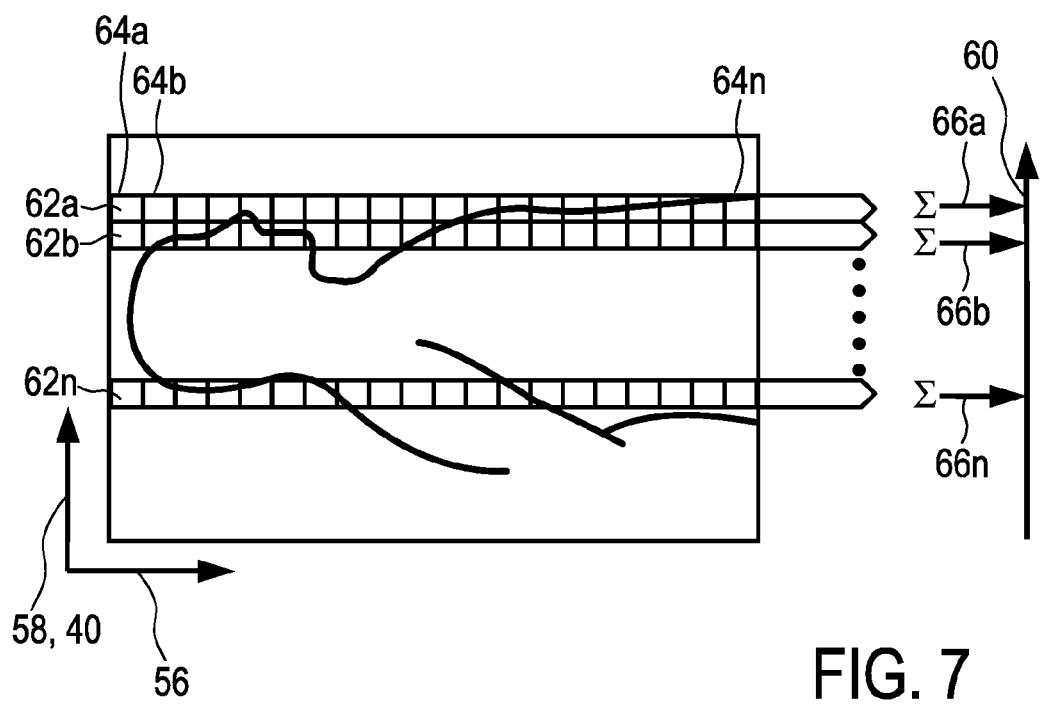
FIG. 7 illustrates an exemplary derivation of the characteristic index element of FIG. 6.

With reference to FIGS. 6 and 7, an exemplary derivation of a characteristic index element 60 representing directional motion information is elucidated. FIG. 6 shows an indicative portion 48 of an image frame. Coordinates describing the position of image entities, e.g. single pixels, are indicated by reference numerals 56, 58, wherein the axis 56 indicates x-coordinates and the axis 58 y-coordinates. Due to a coordinate transformation, ref. FIGS. 4 and 5, the disturbance-reduced index element 40 is aligned with the axis 58. When applying a dimension reduction, the goal is to merge image frame properties into a single characteristic index element 60 without significant signal loss in regard of the desired physiological information 30 indicative of the vital signal of interest.

In this context, FIG. 7 describes an agglomeration and projection of sub-entities 62, 64 to the disturbance-reduced index element 40. The sub-entities 62a, 62b, ..., 62n and 64a, 64b, ..., 64n represent respective pixel positions in the image frame. In case the physiological information 30 is fairly represented by motion along the axis 58, a line by line agglomeration of respective pixel values summarizes relevant information of each line in a single entity on the characteristic index element 60. The conversion is indicated by an arrow 66. By way of example, the lines 62a and 62b are supposed to be highly indicative of the desired signal, as the shape of the indicative portion 12, the chest, forms a significant edge undergoing the breath motion. On the other hand, it can be fairly assumed that the line 62n displaying a back side of the object 10 is less indicative. As outlined above, beside of mere pixel values also further image properties can be drawn for the agglomeration.

Figure 8:
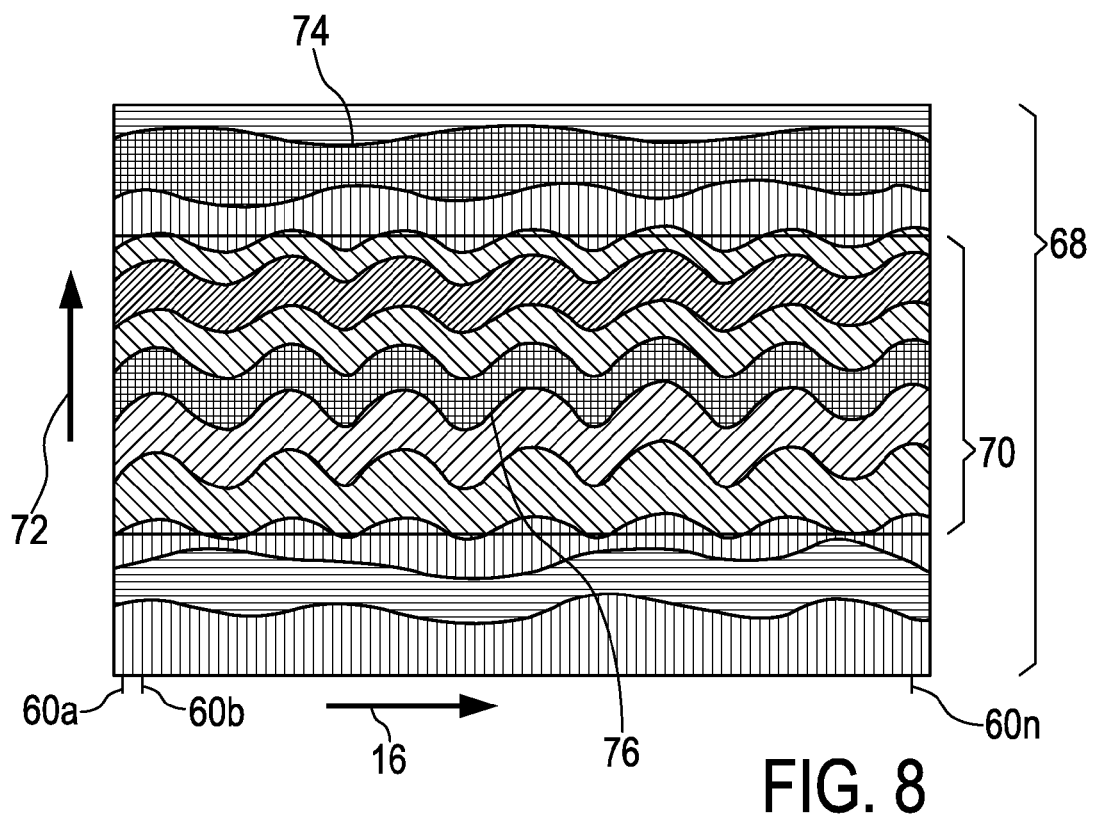
FIG. 8 shows a simplified schematic sequence of characteristic index elements.
Figure 9:
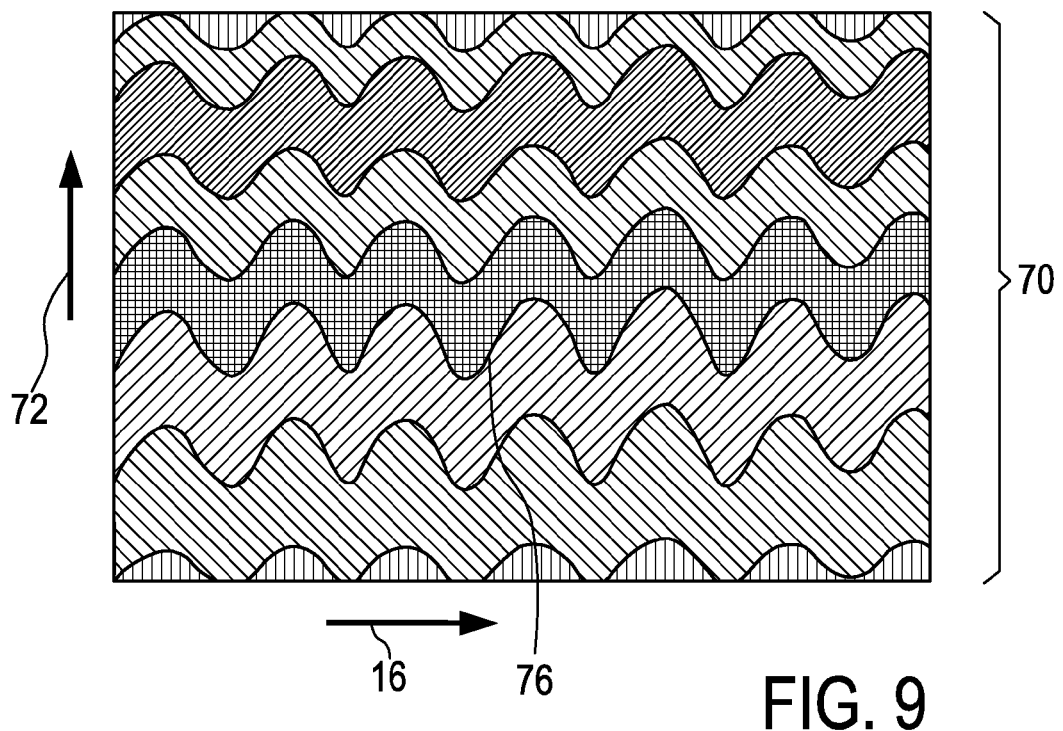
FIG. 9 shows a stretched detail of the simplified schematic sequence of characteristic index elements of FIG. 8.

FIGS. 8 and 9 illustrate an exemplary motion profile obtainable by sequencing a plurality of characteristic index elements 60a, 60b, ..., 60n (representing a sequence of image frames) over time. Integration of discrete elements results in quasi-continuous or continuous wave form. For the sake of visualization, the motion profile shall be understood as represented strictly simplified. Different hatches indicate different line by line agglomeration results. Furthermore, edges provided in the motion profile represent edges rich in contrast in the original image frame (as long as they are substantially orthogonal to the disturbance-reduced index element 40). The temporal pulsation of the edges is understood to be highly-indicative of the desired vital signal.

The general motion profile of FIG. 8 comprises a profile representing the whole continuous or discrete characteristic signal 68 derivable from an image sequence through the dimensional reduction. Furthermore, a subset thereof, a motion-indicative component 70, can be chosen for further analyses. To this end, basic assumptions in regard of the underlying vital signal can be applied. For instance, the motion-indicative component 70 can be supposed to undergo slight periodic motion due to respiration motion of the chest. The frequency of this pulsation can be expected to be within a certain frequency band. In this manner, non-indicative edges 74 can be detected and disregarding during further analyzing steps. On the other hand, indicative edges 76 edges can be drawn or even enhanced for further processing.

An axis 72 indicates the direction of the motion information while the arrow 16 indicates time. It is noted that the axis 72 may comprise qualitative or even quantitative motion information. Generally, nominal position depended information cannot be drawn from qualitative information, e.g. when a scale representing lengthwise motion is missing. Still, however, frequency information can be extracted from qualitative signals. In this connection, when aiming at quantitative motion detection, it is preferred if also a real object, e.g. a reference scale, allowing a quantitative determination of the motion is monitored, at least during an initial setup.

Generally, the motion profile can be expected to be far more complex showing various fluctuations and numerous variations, both when regarded column by column and line by line. For instance, the motion profile can resemble a spectrum profile undergoing temporal changes. However, no frequency band is shown in this embodiment. Instead, frequency information can be derived from the representation provided in FIGS. 8 and 9.

FIG. 9 illustrates a stretched representation of the motion-indicative component 70 of the motion profile. The indicative edge 76 is enhanced accordingly. In case numerous indicative edges are supposed to be in the motion profile, further correlation measures can be applied so as to improve signal quality. This applies if several edges in the real image undergo motion due to respiration, e.g. a plurality of wrinkles and folds in the blanket covering the object.

The indicative edge 74 can be selected through edge detection measures and further emphasized. Finally, a single wave form highly indicative of the desired signal can be obtained, see also the derivative signal from 86 of FIGS. 11 and 12 in this connection.

Figure 10:
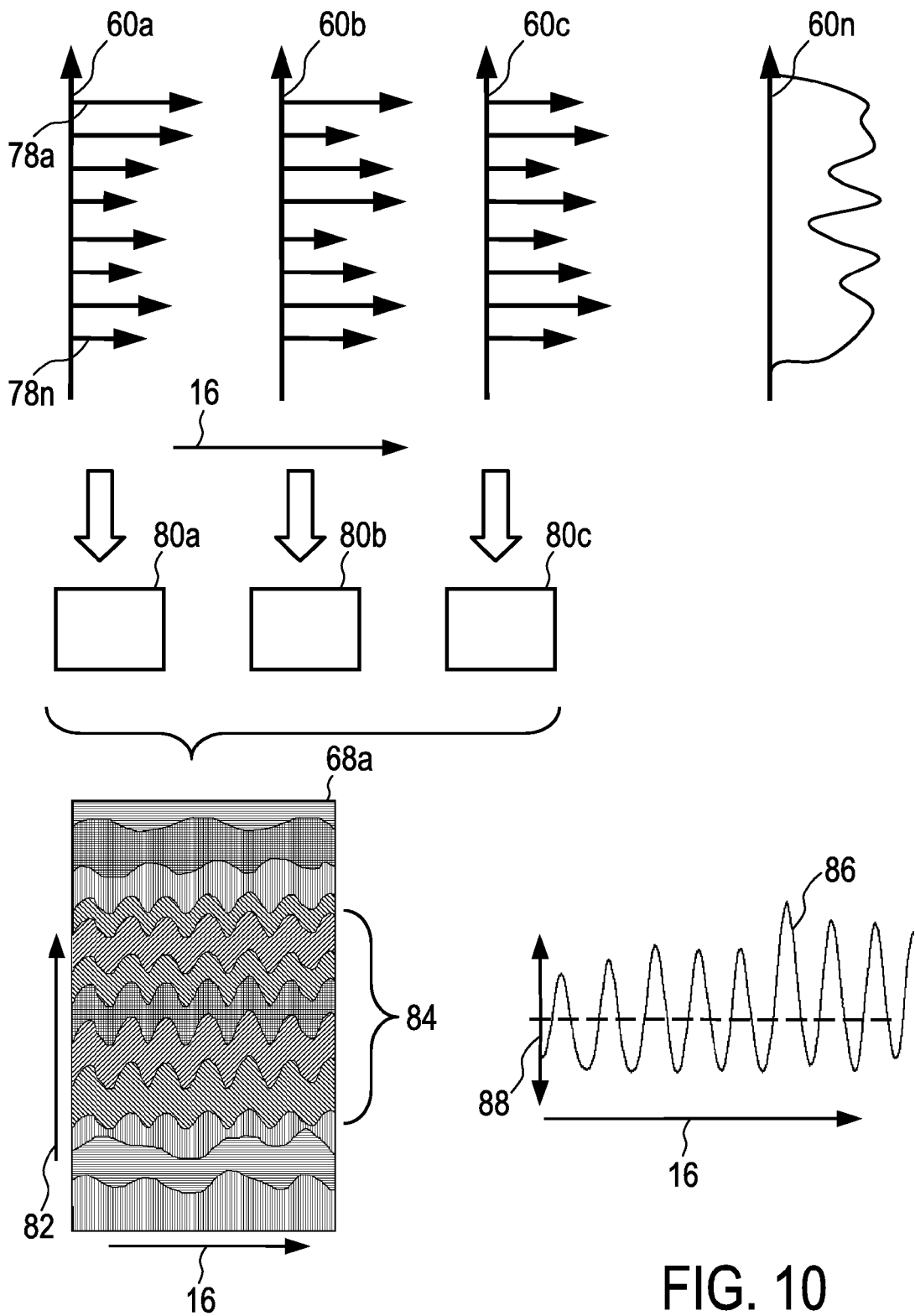
FIG. 10 illustrates a schematic sequence of characteristic index elements to which an integral transformation is applied, and an exemplary illustration of a resulting magnitude range sequence.

In the alternative, referring to FIG. 10, each single characteristic index element 60 can be processed before being sequenced and transferred to the motion profile. In FIG. 10 several consecutive characteristic index elements 60a, 60b, 60c are illustrated, each comprising data stream properties 78a, ..., 78n, each or which representing an agglomerated and projected line of a single image frame, see also FIGS. 6 and 7. Through integration over a plurality of agglomerated data stream properties 78, a characteristic index element 60n can be obtained having a continuous or quasi-continuous wave form.

Further, an integral transformation, especially a Fourier transformation can be applied to each characteristic index element 60a, 60b, 60c, the transformation denoted by 80a, 80b, 80c. Thus, each characteristic index element 60 can be replaced or even supplemented by a magnitude range thereof. In this way, are frequency domain based representation rather that a motion based representation is enabled. The processed signals originating from characteristic index elements can be sequenced over time so as to obtain a magnitude range of interest 84. A magnitude axis 82 indicates the frequencies underlying the representation. Basically, this approach aims at a detection of the desired vital signals based on qualitative wave forms non-indicative of quantitative motion information.

By applying the integral transformation 80, image properties (though captured at the same point in time) are scanned for prominent correlations or frequencies. It could be recognized that also these prominent entities undergo a pulsation over time when the transformed characteristic index elements 60 are being sequenced. Again, applying edge detection measures, a derivative signal form 86 can be obtained highly-indicative of the desired vital signal. The scale 88 of FIG. 10 is considered qualitative in that it is not intended to extract quantitative motion information from the derivative signal form 86 obtained by applying an integral transformation to the characteristic index elements 60. Eventually, whether the characteristic index elements 60 are further processed or not, the highly-indicative derivative signal form 86 can be obtained.

Figure 11:
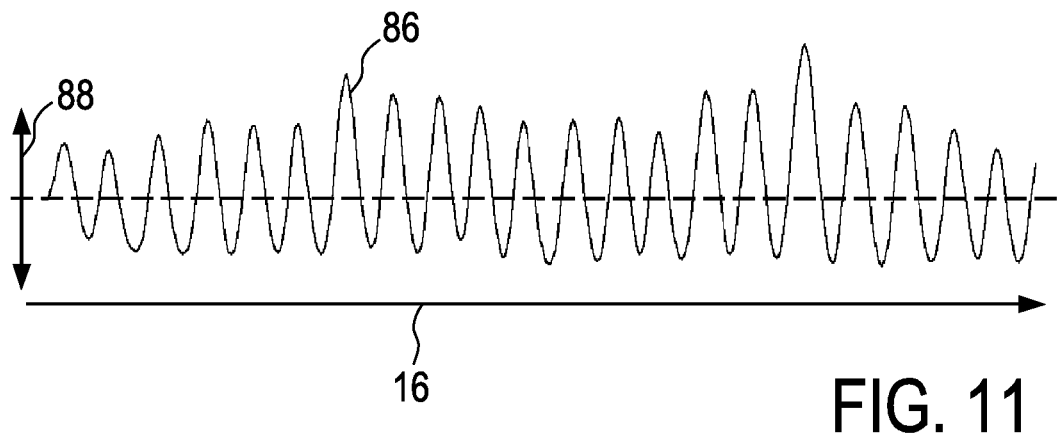
FIG. 11 shows a schematic illustration of derivative signal form.

FIG. 11 shows an illustration of a further exemplary derivative signal form 86. Though the pulsating signal is somehow unsteady in amplitude, the underlying frequency can be obtained by known methods without major efforts. Thus, the desired vital signal, e.g. the respiratory rate of a patient to be monitored, can be extracted from the initial data stream in an unobtrusive manner even under poor ambient conditions.

In case the derivative signal form 86 of FIG. 11 is obtained by sequencing the characteristic index elements 60 without converting motion related signals to frequency band related signals, the scale 88 even can be considered a quantitative scale, either showing absolute or relative position information or, in general, motion information. In this way, even amplitudes, e.g. representing the amount of chest motion, can be detected.

Figure 12:
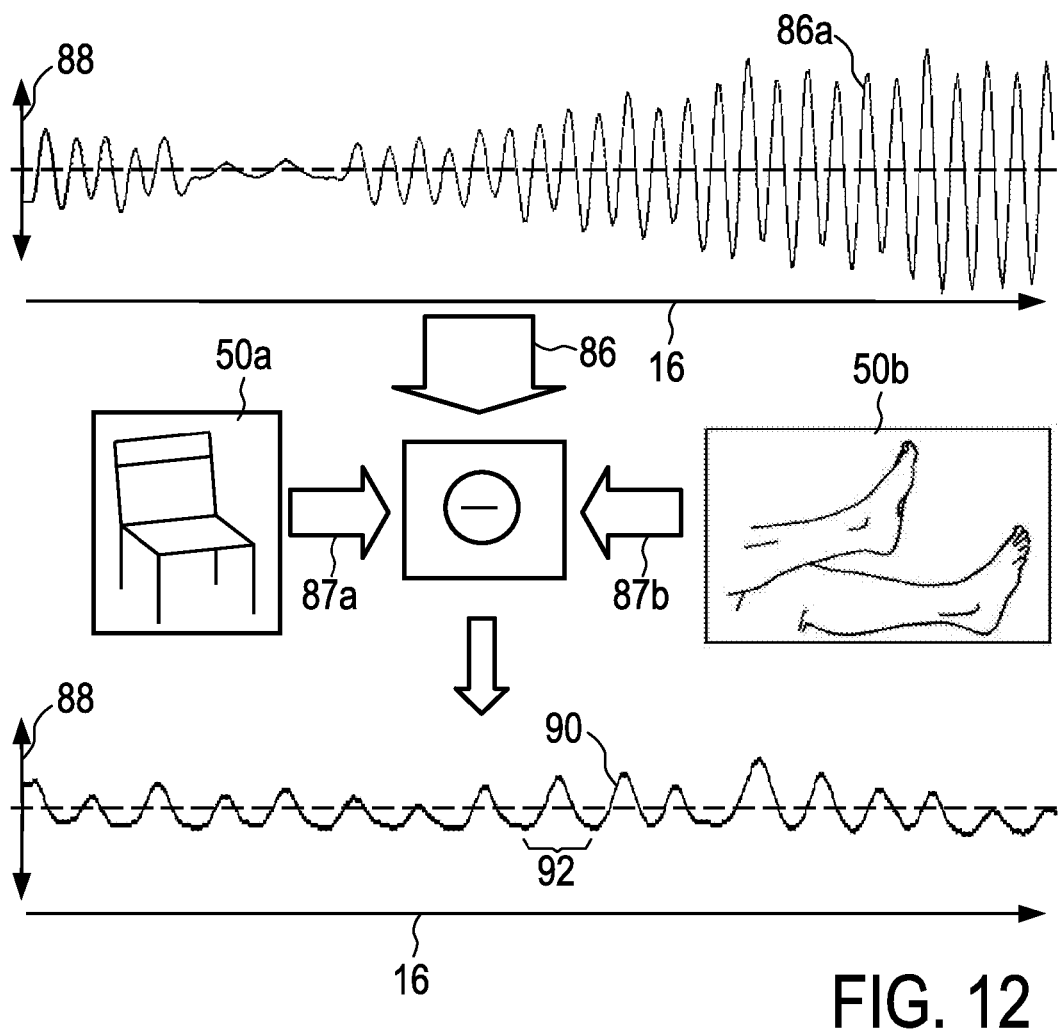
FIG. 12 shows a further schematic illustration of a derivative signal form to which an exemplary compensation for disturbing signal components is applied.

Also FIG. 12 represents an exemplary derivative signal form 86a obtained through data monitoring and processing. In contrast to FIG. 11, the derivative signal form 86a still contains huge remaining disturbing components. This occurs in particular, when the desired object motion is overlaid by considerably disturbing motion, e.g. the object turning in bed, or even global motion. In that case, a signal decomposition based on reference motion patterns can be envisaged. To this end, reference objects can be monitored in addition to the main objects of interest, see also the reference portion 50 in FIG. 4. Processing reference portion image frames results in reference signals, referred to as remaining disturbing signal components 87. These components can be, so to say, subtracted from the derivative signal form 86a arriving at a genuine motion component 90. In FIG. 12, a global motion indicative remaining disturbing signal component 87a and a disturbing object motion indicative remaining disturbing signal component 87b are considered and illustrated by respective reference portions 50a, 50b. Eventually, the frequency underlying the pulsation of the genuine motion component 90 can be detected, for instance by detecting extreme values thereof, as indicated by reference numeral 92.

Figure 13:
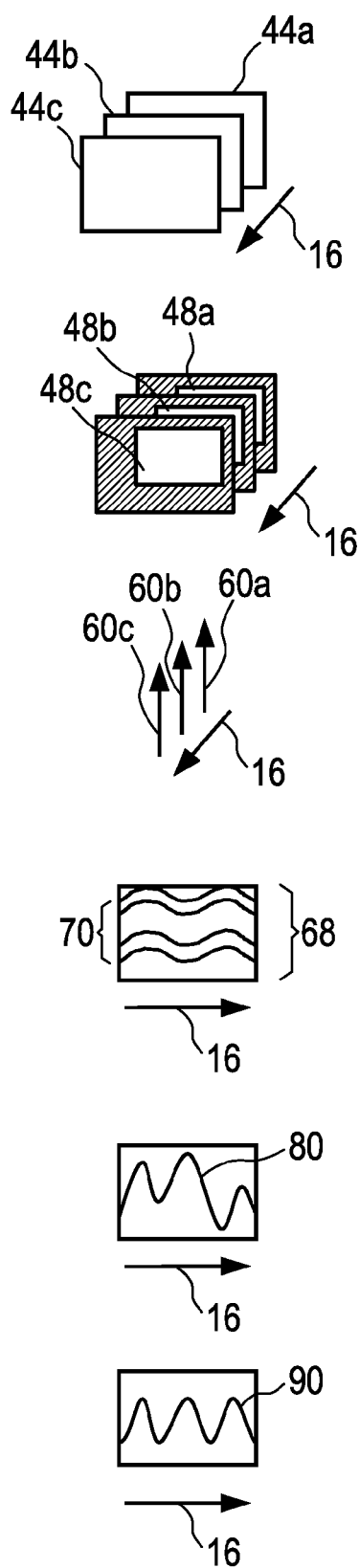
FIG. 13 shows an illustrative block diagram representing several steps of an embodiment of a method according to the invention.
Figure 13:
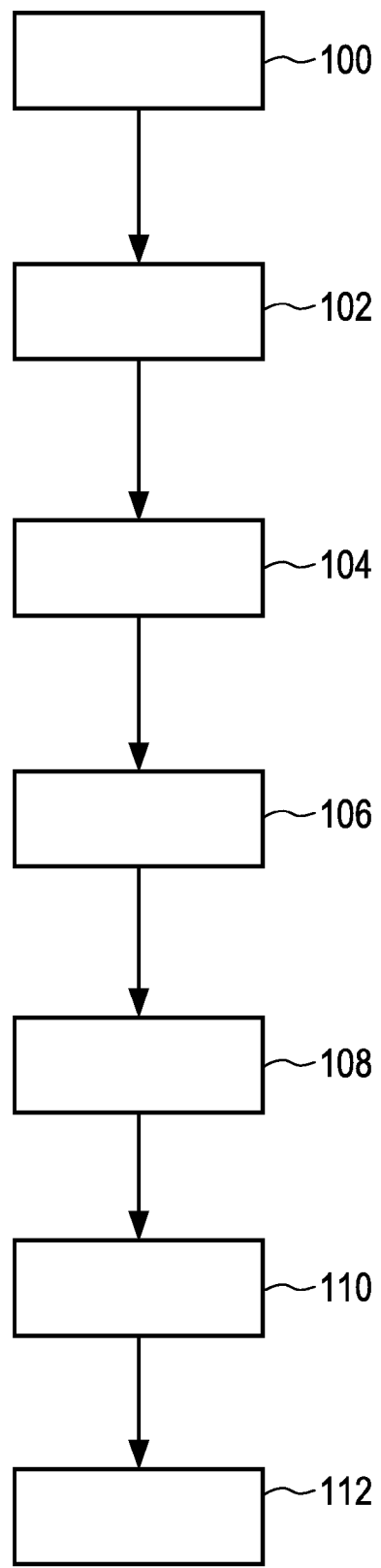

Having demonstrated several alternative exemplary approaches covered by the invention, FIG. 13 is referred to, schematically illustrating a method for extracting information from characteristic signals.

Initially, in a step 100 an input data stream comprising several data stream frames 44a, 44b, 44c is received. The data stream can be delivered from a sensor means 22 or a data buffer or storage means. The data stream can be embodied, by way of example, by a sequence of image frames varying over time, ref reference numeral 16.

In a subsequent step 102 signals of interest derived from the input data stream can be selected and pre-processed. Several pre-processing approaches have been outlined above. Also color normalization and/or luminance normalization can be applied to the data stream in order to downsize the data basis without significant information loss. Selection may comprise detection of regions of interest 48a, 48b, 48c, in general, the regions indicative of desired object motion, or even reference motion.

In a further step 104 a dimensional reduction is applied to respective data stream frames, or, at least, to indicative portions thereof. The dimensional reduction may comprise agglomerating and projecting data stream properties to a disturbance-reduced index element describing a preferential direction of object motion indicative of the vital signal finally to be extracted. In this way, multi-dimensional image frames can be converted to dimension-reduced image frame information, the characteristic index elements 60, still being indicative or the desired object motion.

In an optional sub step, which is not illustrated, integral transformation measures can be applied the characteristic index elements 60. In this connection, reference is made to FIG. 10 and the respective description part.

Further, in a step 106 a plurality of characteristic index elements 60a, 60b, 60c obtained in step 104 is sequenced over time so as to obtain a continuous or discrete characteristic signal 68 comprising a motion-indicative component 70.

Subsequently, in a step 108 pattern detection measures can be applied so as to detect prominent patterns subjected to be caused by the desired object motion. Pattern detection can comprise edge detection, edge emphasizing, or even edge de-emphasizing. In this way, a derivative signal form 86 can be obtained. The derivative signal form 86 may consist of a pulsating single wave form indicative of the desired signal. However, still remaining disturbing signal components can be comprised.

In still another step 110, post-processing can be applied to the derivative signal form 86, aiming at the extraction of a genuine motion component 90 less affected by remaining disturbing signal components.

Eventually, in an analyzing step 112 the vital signal of interest can be detected. The vital signal of interest may comprise frequency based information of even position based information. More particularly, the vital signal of interest can represent an object's respiration rate, or even respiration rate variability. Eventually, an output signal modified in this way can be made available at an output interface and distributed for further use.

Needles to say, in an embodiment of a method in accordance with the invention several of the steps provided can be carried out in changed order, or even concurrently. Further, some of the steps could be skipped as well without departing from the scope of the invention. This applies in particular to several signal processing steps.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A device for extracting information from detected characteristic signals, comprising:
   an interface for receiving a data stream comprising a sequence of image frames derivable from electromagnetic radiation emitted or reflected by an object, the data stream comprising a continuous or discrete characteristic signal including physiological information indicative of desired object motion, the physiological information being representative of at least one at least partially periodic vital signal, and
   an extractor means for extracting the physiological information from the data stream by:
   determining a disturbance-reduced element having a predetermined orientation substantially aligned with a reference motion direction, by extracting a motion indicative component from each of a subset of the image frames,
   determining a characteristic index element from each motion indicative component in accordance with the alignment of the motion indicative component associated with the disturbance-reduced element, and combining the characteristic index elements to form a derivative signal for generating a set of physiological information indicative of the at least one at least partially periodic vital signal.

2. The device as claimed in claim 1, wherein the derivative signal form is further indicative of a remaining disturbing signal component, the device further comprising a converter means for converting the derivative signal form by enhancing a desired object motion component of the derivative signal form indicating the vital signal and by suppressing a remaining disturbing signal component.

3. The device as claimed in claim 1, further comprising an analyzing means for determining temporal variation of the derivative signal form or the desired object motion component corresponding to the at least one at least partially periodic vital signal.

4. The device as claimed in claim 1, wherein each characteristic index element is derived from a respective image frame.

5. The device as claimed in claim 1, wherein the extraction of the physiological information from the data stream further comprises processing the captured data stream sequence by determining a portion of interest highly-indicative of desired object motion.

6. The device as claimed in claim 1 further comprising a sensor means for detecting an electromagnetic radiation within at least one particular wavelength range selected from the group consisting of visible light, infrared light, and ultraviolet radiation, the sensor means being connectable to the interface.

7. The device as claimed in claim 1, wherein the extractor means is further configured for agglomerating and projecting data stream properties associated with respective sub entities of the image frame comprised in the data stream to the disturbance-reduced element, thereby obtaining the respective characteristic index element.

8. The device of claim 1, wherein the extractor means is further adapted to determine the predetermined orientation of the disturbance-reduced element taking into account the reference motion direction.

9. The device as claimed in claim 2, wherein the conversion of the derivative signal form further comprises processing the derivative signal form or the desired object motion component embedded therein, and wherein the processing is selected from the group consisting of motion compensation, filtering, windowing, clipping, edge emphasizing, and edge de-emphasizing.

10. The device as claimed in claim 7, wherein the extractor means is further adapted to apply an integral transformation to at least one respective characteristic index element, thereby obtaining spectral information.

11. The device as claimed in claim 10, wherein the extractor means is adapted to apply a Fourier transformation to respective characteristic index elements so that a sequence of magnitude ranges can be obtained.

12. The device of claim 6, wherein the extractor means is further adapted for compensation for disturbing motion with respect to object motion non-indicative of the desired vital signal or to overall relative motion between the object and the sensor means.

13. A device for extracting information from detected characteristic signals, comprising:

an interface configured to receive a data stream comprising a sequence of image frames derivable from electromagnetic radiation emitted or reflected by an object, the data stream comprising a continuous or discrete characteristic signal including physiological information indicative of desired object motion, the physiological information being at least one at least partially periodic vital signal, one or more computer processors configured to:

derive the physiological information from the data stream by determining a disturbance-reduced element, the disturbance-reduced element having a predetermined orientation substantially aligned with a reference motion direction by extracting a motion indicative component from each of at least a subset of the image frames;

determine a characteristic index element from each motion indicative component, determine a temporal variation of the motion indicative component based on at least a relative offset between a current characteristic index element and a preceding or subsequent characteristic index element, and form a derivative signal for generating a set of physiological information indicative of the at least one at least partially periodic signal.

14. A method for extracting information from detected characteristic signals, comprising the steps:

with one or more processors, receiving a data stream comprising a sequence of image frames derivable from electromagnetic radiation emitted or reflected by an object, the data stream comprising a continuous or discrete characteristic signal including physiological information indicative of desired object motion, the physiological information being representative of at least one at least partially periodic vital signal, and with the one or more processors, extracting the physiological information from the data stream by deriving a plurality of characteristic index elements from the data stream through a dimensional reduction, the plurality of characteristic index elements comprising a directional motion component associated with a disturbance-reduced element, the disturbance-reduced element having a predetermined orientation substantially aligned with a reference motion direction, the plurality of characteristic index elements being indicative of a derivative signal form comprising the physiological information; and with the one or more processors, combining the characteristic index elements to form a derivative signal for generating a set of physiological information indicative of the at least one at least partially periodic signal.

15. A computer program comprising program code means stored on a non-transitory computer-readable medium for causing a computer to carry out the steps of the method as claimed in claim 14 when said computer program is carried out on the computer.

16. A device for extracting information from detected characteristic signals, comprising:

an interface configured to receive a sequence of image frames derivable from electromagnetic radiation emitted or reflected by an object, the sequence of image frames including a characteristic signal including physiological information indicative of desired object motion, the physiological information being representative of at least one at least partially periodic vital signal, and one or more processors programmed to: extract the physiological information from the sequence of images by:

deriving from the data stream through a dimensional reduction a directional motion component associated with a disturbance-reduced element, the disturbance-reduced element having a predetermined orientation substantially aligned with a reference motion direction, the directional motion component being indicative of a derivative signal form comprising the physiological information;

converting the derivative signal form by enhancing a desired object motion component of the derivative signal form indicating the at least one at least partially periodic vital signal and by suppressing a remaining disturbing signal component; and analyzing a temporal variation of the derivative signal form or the desired object motion component corresponding to the at least one at least partially periodic vital signal to generate a set of physiological information indicative of the at least one at least partially periodic vital signal.

17. The device of claim 16, wherein the one or more processors are further programmed to:

provide the at least one at least partially periodic vital signal at an output interface; and distribute the at least one at least partially periodic signal for further use.

18. The device of claim 16, wherein the one or more processors are further programmed to:

from at least a relative offset between a current directional motion component and a preceding or subsequent directional motion component, determine the temporal variation of the derivative signal form or the desired object motion component indicative of the desired vital signal.

19. The device of claim 16, wherein the sequence of image frames is derived from electromagnetic radiation within a wavelength range selected from the group consisting of visible light, infrared light, and ultraviolet radiation.

20. The device of claim 16, wherein the one or more processors are further programmed to:

agglomerate and project properties associated with respective sub-entities of each image frame comprised in the sequence of image frames to the disturbance-reduced element, thereby obtaining the respective directional motion component.

* * * * *